UNITED STATES PATENT OFFICE 2,020,076

PROCESS FOR THE PRODUCTION OF CHLORINATED RUBBER

Eugen Möllney, Ammendorf, Germany, assignor to the firm Chemische Fabrik Buckau, Ammendorf (Saalkreis), Germany No Drawing. Application May 22, 1934, Serial No. 726,954. In Germany May 26, 1933

9 Claims. (Cl. 134—17)

This invention relates to a process for the production of chlorinated rubber.

Chlorinated rubber is usually produced by passing chlorine through solutions of raw rubber. However, both the originating solutions and the resulting solutions of chlorinated rubber are usually very highly viscous liquids and are consequently very difficult to manipulate. Attempts have already been made to lower the high viscosity of these liquids, either by heating them, lessening their rubber content, or finally, by irradiation, especially with ultraviolet rays.

These measures however, are attended with certain difficulties so that for example, notwithstanding the employment of high temperatures, stirring devices are always required to keep the liquids in continuous movement and if it be desired to lower the viscosity by operating with low rubber concentrations, comparatively large quantities of liquid have to be passed through the apparatus, thereby rendering the whole process more expensive. The irradiation of the solutions entails the construction of a special apparatus, which may not be of a simple character, and the inclusion of which in the process gives rise to special difficulties.

The present invention aims at obviating these difficulties. To this end, the invention consists in adding hypochlorites to the solutions used in the process of producing chlorinated rubber. Such hypochlorites may be added before, during or after chlorination, or also during several or all of the stages of the process; nevertheless, it is preferable to add the hypochlorite to the solutions of raw rubber prior to chlorination.

The hypochlorites employed may be those of the alkali metals including ammonium in this term or also those of the alkaline earth metals.

When small quantities of such a hypochlorite are added to a freshly prepared rubber solution, which is highly viscous, and the solution is stirred a liquid is obtained within a comparatively short time, which is of such low viscosity that it can be chlorinated to form chlorinated rubber in a simple vessel, without any special auxiliary stirring or other devices.

If, for example, a 2% solution of rubber in carbon tetrachloride is treated with 0,2% of its volume of sodium hypochlorite solution containing 170 grms. of active chlorine per litre the original viscosity of 60 to 100 seconds (Wasag) diminishes to 1 second after the solution has been stirred for half an hour.

If, also by way of example, a 4% solution of rubber in carbon tetrachloride is treated with 0,35% of potassium hypochlorite solution, containing 160 grms. of active chlorine per litre, the original viscosity which is too high to be measured, falls to 9 seconds after an hour's stirring.

The best results are obtained when the amount of hypochlorite added does not exceed that corresponding to a content of 1% of active chlorine referred to the solution of rubber or of chlorinated rubber.

The low-viscosity solutions obtained in this manner can now be very easily further treated without the aforesaid difficulties being encountered.

As already mentioned, it is unnecessary to confine the addition of the hypochlorites to the original rubber solution, but it has also been found highly useful to add a certain small quantity of hypochlorite during chlorination especially towards the end of that operation. By this means the precipitation of incompletely chlorinated rubber which sometimes occurs is avoided. Finally, small amounts of hypochlorite may also be added to the finished solution of chlorinated rubber shortly before the precipitation of the latter. In such case the precipitated chlorinated rubber will at once exhibit a fine white colour which could hitherto be obtained only by prolonged storage or irradiation of the solution.

What I claim is:

1. In the production of rubber chloride solutions by the chlorination of rubber solutions, the process which comprises adding to such a solution prior to the final precipitation of the resulting rubber chloride a small amount of a hypochlorite selected from a group consisting of the alkali metal and alkaline earth metal hypochlorites.

2. The process of reducing the viscosity and improving the quality of rubber chloride solutions resulting from the chlorination of a rubber solution which comprises adding to at least one of said solutions prior to precipitation of the rubber chloride a small amount of a hypochlorite selected from a group consisting of the alkali metal and alkaline earth metal hypochlorites.

3. The process of claim 2 wherein the hypochlorite is added to the rubber solution before chlorination.

4. The process of claim 2 wherein the hypochlorite is added to the solution during chlorination.

5. The process of claim 2 wherein the hypochlorite is added to the solution after chlorination.

6. The process of claim 2 wherein a hypochlorite is added to the solution at more than one stage of its process of chlorination.

7. The process of claim 2 wherein the amount of hypochlorite added does not substantially exceed an amount corresponding to 1 per cent calculated as active chlorine, based on the solution of rubber or of chlorinated rubber.

8. The process of claim 2 wherein the hypochlorite is potassium hypochlorite.

9. The process of claim 2 wherein the hypochlorite is sodium hypochlorite.

EUGEN MÖLLNEY.